Feb. 18, 1969  T. MUELLER  3,428,341
FLEXIBLE DUCT COUPLING FOR AIR DIFFUSING SYSTEM
Filed Dec. 27, 1966

Inventor
THEODORE MUELLER
By
Attorney

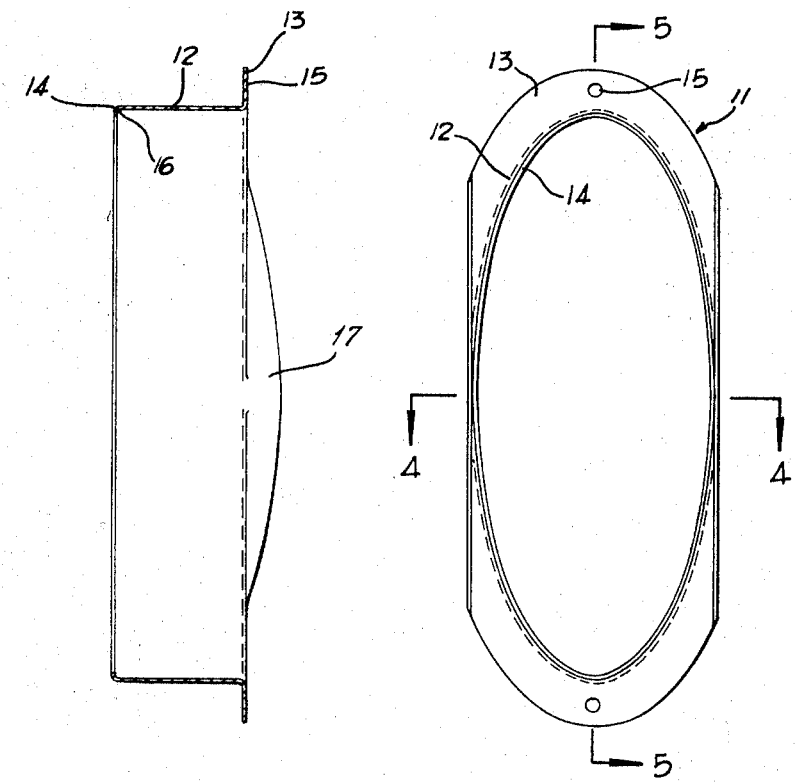

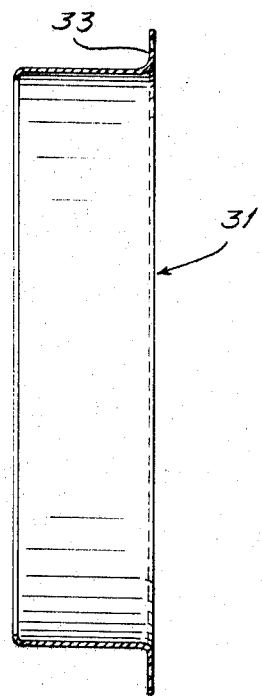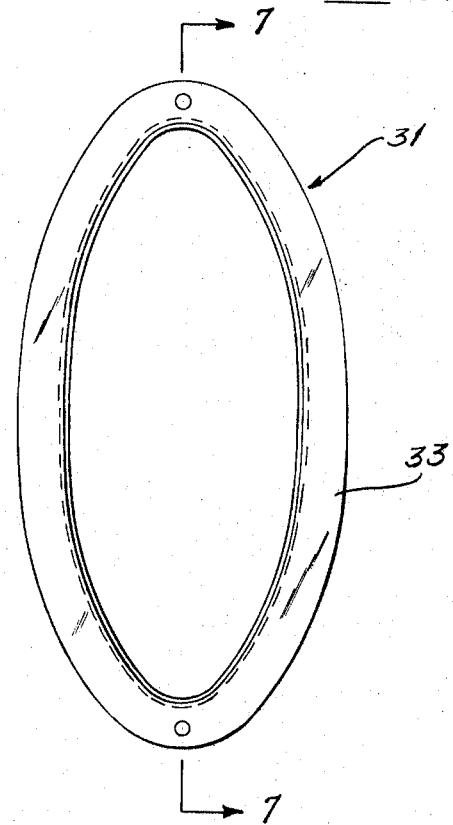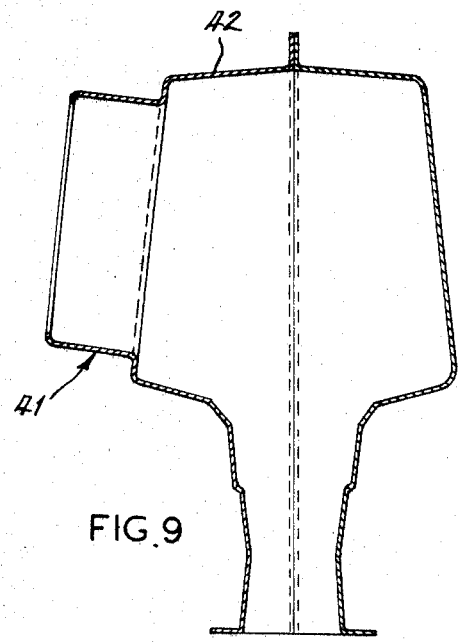

United States Patent Office 3,428,341
Patented Feb. 18, 1969

3,428,341
FLEXIBLE DUCT COUPLING FOR AIR DIFFUSING SYSTEM
Theodore Mueller, St. Louis, Mo., assignor to Emerson Electric Co., St. Louis, Mo., a corporation of Missouri
Filed Dec. 27, 1966, Ser. No. 605,049
U.S. Cl. 285—158                    7 Claims
Int. Cl. F16l 33/00, 41/00, 47/00

ABSTRACT OF THE DISCLOSURE

The combination of circular flexible duct of the type having a helical coil of resilient material covered with a flexible covering and a connecting collar for connecting the duct with a sheet metal housing, the collar having an inwardly turned circumferentially uninterrupted annular lip, the inner edge of which lies in substantially a single plane and defines an opening the circumference of which is approximately equal to pi times the nominal inner diameter of the duct. The end of the duct is fitted within the compass of the lip, by compressing it radially, inserting the end, and permitting it to expand in such a way that at least one full turn of the coil is within the collar, the lip engaging the flexible covering to form a seal and the coil crossing the lip at one place.

BACKGROUND OF THE INVENTION

This invention relates to an air distributing system and particularly to connecting means for joining a flexible air duct to a sheet metal housing, as for example a metal distributing or proportionating duct or an air diffuser. The flexible duct for use in this invention normally comprises a helical coil or skeleton or resilient material and a flexible covering. Numerous flexible ducts of this general type are known.

Heretofore, when a flexible duct was to be connected to a sheet metal housing at an opening in the housing, the housing has been provided with a nipple or sleeve around the opening, the sleeve being of slightly smaller diameter than the flexible duct, and the flexible duct has been pulled over the sleeve and held in position with an adhesive tape, or the like, sometimes by a clamp and sometimes just by a screw or screws through the wall of the duct and into the sleeve. This type of connection often has not proved very satisfactory, because the flexible duct cannot be held very securely and because careful taping has proved necessary to provide a good air seal.

One of the objects of this invention is to provide a connector for connecting a flexible duct to a sheet metal housing which holds the flexible duct tightly and without slipping, and provides a good air seal without the use of tape.

Another object is to provide such a connector which will conform a normally circular flexible duct to the shape of elliptical or other shaped openings in the housing, as well as circular openings.

Another object is to provide such a connector which is extremely simple to use, and inexpensive to manufacture.

In accordance with this invention, generally stated, in combination with a circular flexible duct with a helical coil covered with a flexible material, a connector is provide for connecting the duct to a housing, the connector comprising a collar connected at one edge to the housing and having an inwardly turned lip around its other edge. The flexible duct, rather than fitting around the outside of the collar, fits within the collar and is held by the interaction of the inwardly turned lip and the helical coil of the flexible duct. The inner circumference of the lip of the collar is preferably equal to pi times the nominal inner diameter of the flexible duct.

BRIEF DESCRIPTION OF THE DRAWING

In the drawings,
FIGURE 3 is a view in front elevation of another embodiment of the connector of this invention;
FIGURE 4 is a sectional view taken along line 4—4 of FIGURE 3;
FIGURE 5 is a sectional view taken along line 5—5 of FIGURE 3;
FIGURE 7 is a sectional view, taken along the line 7—7, of still another embodiment of connector of this invention;
FIGURE 8 is a top plan view of the connector shown in FIGURE 7;
and
FIGURE 9 is a sectional view of still another embodiment of connector of this invention.

DESCRIPTION OF THE PREFERRED EMBODIMENTS

Figure 2:
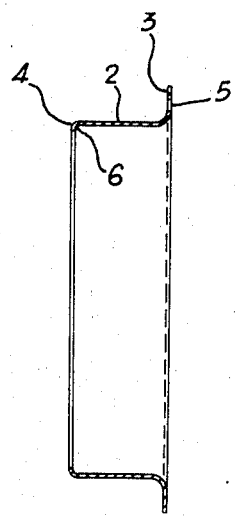
FIGURE 2 is a sectional view taken along the line 2—2 of FIGURE 1.
Figure 1:
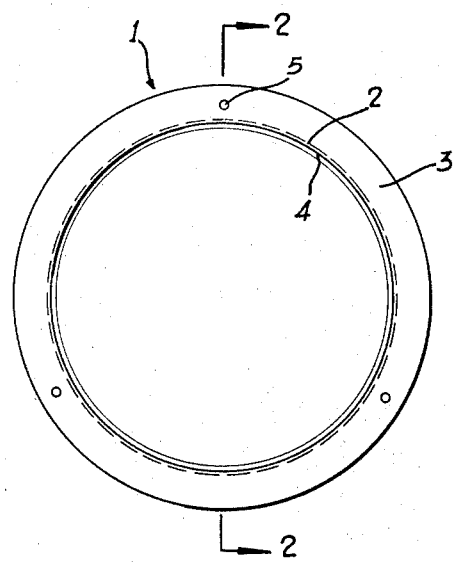
FIGURE 1 is a view in front elevation of one embodiment of the connector of this invention.

Referring now to FIGURES 1 and 2 for one illustrative embodiment of this invention, reference numeral 1 indicates a connector of this invention including a circular collar 2 having at its inner edge an integral outwardly turned flange 3 and at its outer edge a small inwardly turned circumferentially uninterrupted integral lip 4. The flange 3 is provided with holes 5 to accommodate screws for attaching the connector 1 to a housing. The lip 4 is preferably quite small. When the connector is made to accommodate flexible ducts of approximately four inch to seven inch diameter the lip extends inwardly in the order of only $\frac{1}{16}$ of an inch. Thus with nominal 5 inch inner diameter ducts the inner diameter of the collar 2 is 5⅛ inches and the inner diameter of the lip 4 is 5 inches. The radius of curvature of the lip, as shown at 6 in FIGURE 2, is typically $\frac{1}{16}$ of an inch.

The flange 3 may be attached to the housing with screws, not shown, driven into the housing through the holes 5, or in any other conventional way, with the flange either inside or outside the housing. As shown particularly in FIGURE 6, a flexible duct 20 is connected simply by compressing the end of the duct slightly, forcing at least one complete turn of a helix 21 of a helical coil 22 into the collar, and releasing the helix. The lip 4 engages flexible covering 23 of the duct around the periphery of the duct, and though the helix of the coil crosses the lip at one place the resulting joint is air-tight and has remarkable resistance to dislodgement.

Figure 6:
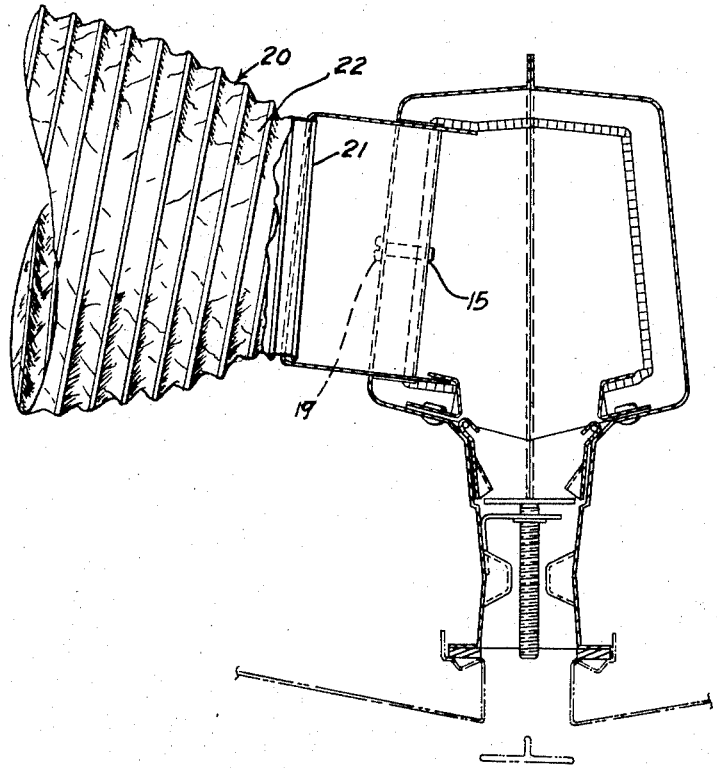
FIGURE 6 is a view in cross section of an air diffuser showing a connector of the embodiment shown in FIGURES 3–5.

Another embodiment of this invention is shown in FIGURES 3–6. In this embodiment a connector 11 has a collar 12 which in plan is in the shape of an ellipse. An outwardly turned integral flange 13 at the inside edge of the collar 12 is given right angle bends along lines tangent to the topmost and bottommost points of the ellipse, to form inwardly extending shelves 17 in the plane of the collar. Screw holes 15 are provided at the unbent ends of the flange. An inwardly curled lip 14 at the outer edge of the connector 11 again has a $\frac{1}{16}$ inch radius of curvature 16 typically, and extends inwardly $\frac{1}{16}$ of an inch from the inside of the collar. The connector 11 may be attached to a housing around an opening therein, as shown in FIGURE 6, where it is attached to an air outlet manifold for a commercial air conditioning system. The unbent part of the flange 13 is on the outside of the housing and is held to the housing by screws 19. The shelves 17 project into the housing through an opening and serve to support insulation in the housing at the opening.

In the embodiment shown in FIGURES 7 and 8, a connector 31 is provided which has in plan a simulated elliptical opening and a planar flange 33 as distinguished from the partly bent or wiped flange 13 of the embodiment shown in FIGURES 3–6.

In the embodiment shown in FIGURE 9, a connector 41 is made integral with a housing 42 of an air manifold system.

In every embodiment, a flexible duct completes the system and is compressed to pass a lip edge.

The connector of this invention can be made by drawing, spinning, stamping or other common and simple processes.

Numerous variations in the system of this invention will occur to those skilled in the art in the light of the foregoing disclosure. For example, while the helix in the flexible duct illustrated is made of round, plastic covered steel spring wire, it can be made of uncovered steel ribbon to which an impregnated cloth or plastic is secured by crimping the ribbon edges, or of other suitably supportive material. The flange for holding the connector to a housing can be varied to numerous shapes to fit the needs of a particular job and, as has been indicated by the embodiment shown in FIGURE 9, can be eliminated altogether. Likewise, the collar may be any desired rounded shape, and may be reduced in height, even to the place at which it is flush with the housing surface, though a projecting collar wall normally serves a sealing or baffling function and tends to ensure that the interior of the housing is unobstructed by the inserted duct.

Having thus described the invention, what is claimed and desired to be secured by Letters Patent is:

1. In an air diffusing system including a sheet metal housing, the combination of a substantially circular flexible duct, said duct having a helical coil and a flexible covering around said helical coil, and a connector for attaching said flexible duct to said housing, said connector comprising a collar having an inner face, an outer face and an outer edge, said connector being connected to said housing and defining an opening therein and having along its outer edge an inwardly turned lip, said lip having an annular circumferentially continuous inner edge lying in substantially a single plane and having an inner circumference on the order of pi times the nominal inner diameter of the said flexible duct, the helical coil of the free end of said flexible duct being compressed normally radially and inserted into the said collar and released, at least one full turn of the coil extending within said collar, the coil being caught by said lip with said lip engaging the flexible covering of said duct to form a seal and the coil crossing the lip at one place.

2. The connector of claim 1 wherein the collar has an inner edge along which an outwardly turned flange extends, said flange being attached to said housing.

3. The connector of claim 2 wherein said lip is integral with said collar.

4. The connector of claim 3 wherein the collar is a round band.

5. The connector of claim 3 wherein the collar is an elliptical band.

6. The connector of claim 1 wherein said lip extends inwardly about 1/16 of an inch beyond the inner face of said collar.

7. The connector of claim 1 wherein the collar is integral with the housing.

References Cited
UNITED STATES PATENTS

| | | | |
|---|---|---|---|
| 1,099,833 | 6/1914 | White | 285—238 X |
| 1,274,438 | 8/1918 | Nettleton | 285—260 |
| 2,366,067 | 12/1944 | Smith | 285—260 X |
| 2,507,535 | 5/1950 | Madsen. | |
| 2,567,773 | 9/1951 | Krupp | 285—260 X |
| 2,984,503 | 5/1961 | Cunningham | 285—260 |
| 3,131,954 | 5/1964 | Kramer et al. | 285—238 |
| 3,168,382 | 2/1965 | Chambers et al. | 285—7 X |
| 3,172,399 | 3/1965 | Lentz et al. | 285—238 X |

THOMAS F. CALLAGHAN, *Primary Examiner.*

U.S. Cl. X.R.

285—178, 238